United States Patent
Kim

(10) Patent No.: US 10,472,801 B2
(45) Date of Patent: Nov. 12, 2019

(54) SYSTEM FOR MEASURING FRICTION FORCE OF EXCAVATOR SWING DEVICE FOR SUPPLYING LUBRICATING OIL

(71) Applicant: VOLVO CONSTRUCTION EQUIPMENT AB, Eskilstuna (SE)

(72) Inventor: Ji-Yun Kim, Gyeongsangnam-do (KR)

(73) Assignee: Volvo Construction Equipment AB, Eskilstuna (SE)

(*) Notice: Subject to any disclaimer, the term of this patent is extended or adjusted under 35 U.S.C. 154(b) by 129 days.

(21) Appl. No.: 15/536,054

(22) PCT Filed: Dec. 19, 2014

(86) PCT No.: PCT/KR2014/012552
§ 371 (c)(1),
(2) Date: Jun. 14, 2017

(87) PCT Pub. No.: WO2016/098928
PCT Pub. Date: Jun. 23, 2016

(65) Prior Publication Data
US 2017/0335545 A1    Nov. 23, 2017

(51) Int. Cl.
*E02F 9/10* (2006.01)
*E02F 9/20* (2006.01)
(Continued)

(52) U.S. Cl.
CPC ............... *E02F 9/10* (2013.01); *E02F 9/123* (2013.01); *E02F 9/126* (2013.01); *E02F 9/2004* (2013.01);
(Continued)

(58) Field of Classification Search
None
See application file for complete search history.

(56) References Cited

U.S. PATENT DOCUMENTS 5,438,771 A * 8/1995 Sahm ...................... E02F 3/435
                                                                 172/7
2013/0111688 A1   5/2013 Schwab et al.
(Continued)

FOREIGN PATENT DOCUMENTS

JP    H0226312 A    1/1990
JP    H042377727 A  8/1992
(Continued)

OTHER PUBLICATIONS

European Official Action (dated Jun. 18, 2018) for corresponding European App. 14908494.9.
International Search Repots (dated Aug. 21, 2015) for corresponding International App. PCT/KR2014/012552.
European Official Action (dated Apr. 3, 2019) for corresponding European App. 14908494.9.

*Primary Examiner* — Lail A Kleinman
(74) *Attorney, Agent, or Firm* — Sage Patent Group

(57) ABSTRACT

An excavator includes at least one gyro sensor for sensing the incline of equipment; a swing motor for rotating an upper body of the excavator; a first pressure sensor for sensing an operating pressure value applied to the swing motor; a swing joystick for driving the swing motor; a second pressure sensor for sensing a manipulation value inputted into the swing joystick; and a controller, wherein the controller receives pieces of information sensed by the gyro sensors, the first pressure sensor, and the second pressure sensor, and detects the operating pressure value of the swing motor, sensed through the first pressure sensor, so as to notify a worker of the time at which lubricating oil is added if a maximum manipulation value is inputted into the swing joystick for a minimum measuring time or more in a swing friction force measurement mode.

6 Claims, 3 Drawing Sheets

(51) Int. Cl.
  *E02F 9/22* (2006.01)
  *E02F 9/26* (2006.01)
  *E02F 9/12* (2006.01)
  *F16N 29/04* (2006.01)
  *F02D 29/04* (2006.01)
  *E02F 3/30* (2006.01)
  *E02F 3/32* (2006.01)
  *G01L 5/00* (2006.01)

(52) U.S. Cl.
  CPC ............ *E02F 9/226* (2013.01); *E02F 9/2285* (2013.01); *E02F 9/26* (2013.01); *E02F 9/267* (2013.01); *F02D 29/04* (2013.01); *F16N 29/04* (2013.01); *G01L 5/00* (2013.01); *E02F 3/301* (2013.01); *E02F 3/32* (2013.01); *E02F 9/2292* (2013.01); *E02F 9/268* (2013.01); *F16N 2250/42* (2013.01)

(56) References Cited

U.S. PATENT DOCUMENTS

| 2014/0107897 | A1* | 4/2014 | Zhu | E02F 3/435 701/50 |
| 2015/0240458 | A1* | 8/2015 | Nagato | E02F 3/435 701/32.7 |
| 2017/0268540 | A1* | 9/2017 | Moriki | E02F 9/22 |

FOREIGN PATENT DOCUMENTS

| JP | 2627776 | B2 | 7/1997 |
| JP | 11036376 | A | 2/1999 |
| JP | 2004100647 | A | 4/2004 |
| JP | 2005188434 | A | 7/2005 |
| JP | 2006010014 | A | 1/2006 |
| JP | 2010203535 | A | 9/2010 |

* cited by examiner

[Fig. 1]
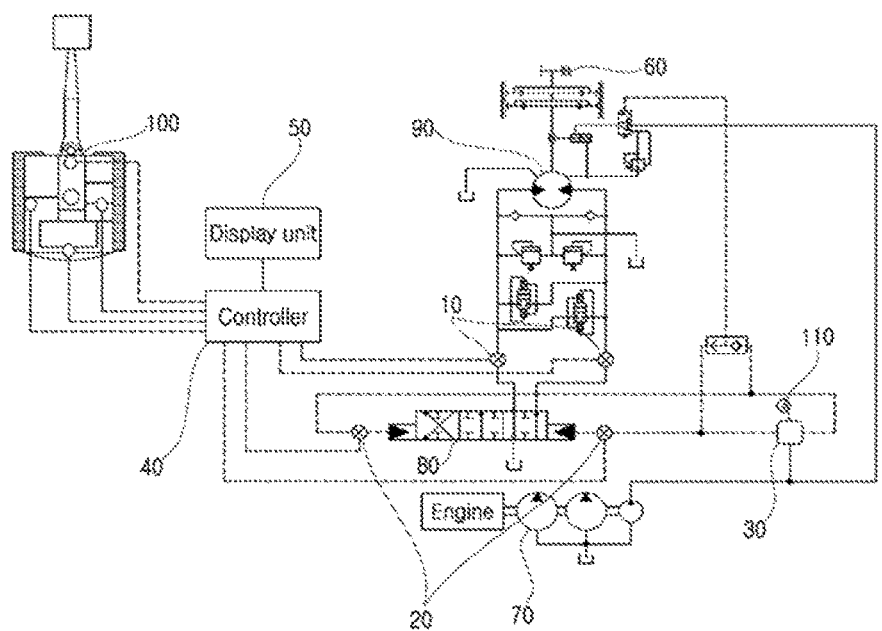
[Fig. 2]
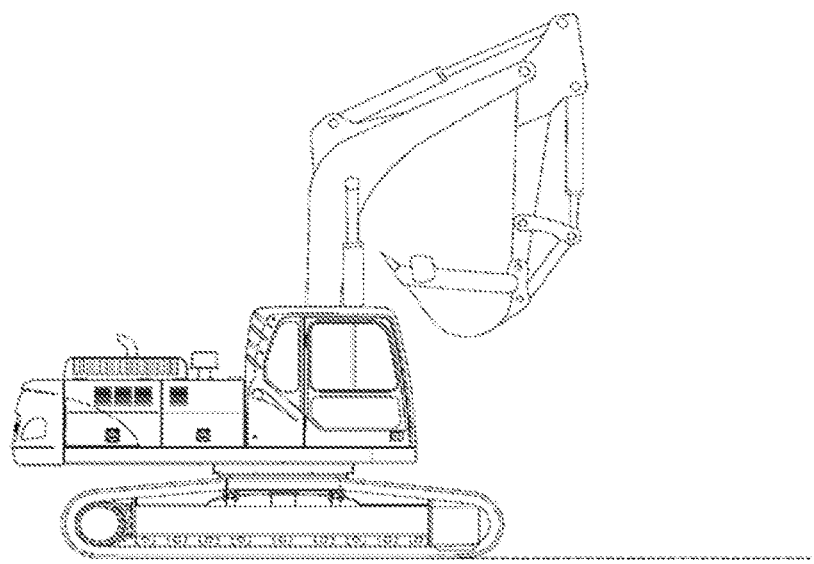

[Fig. 3]
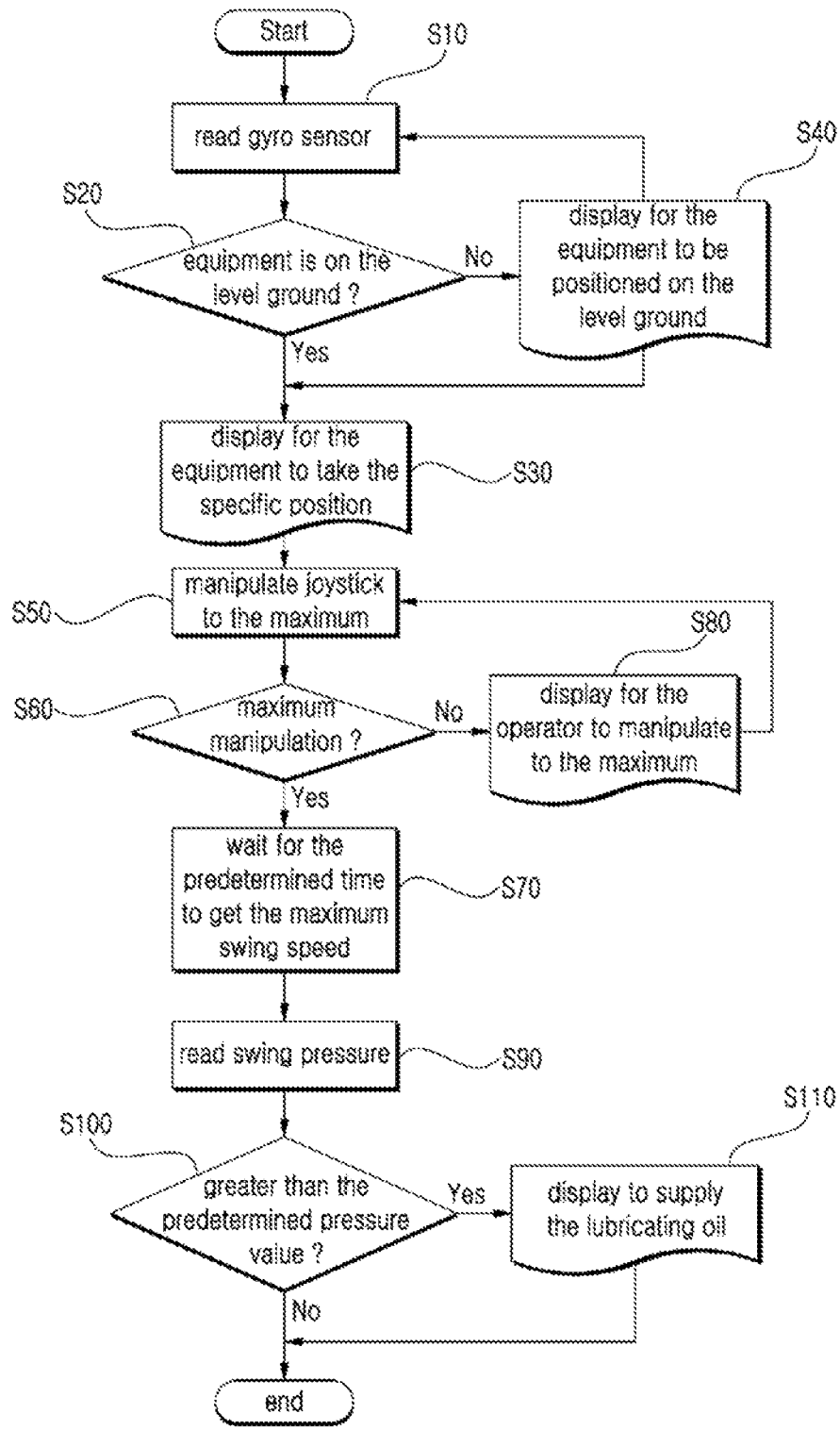

[Fig. 4]
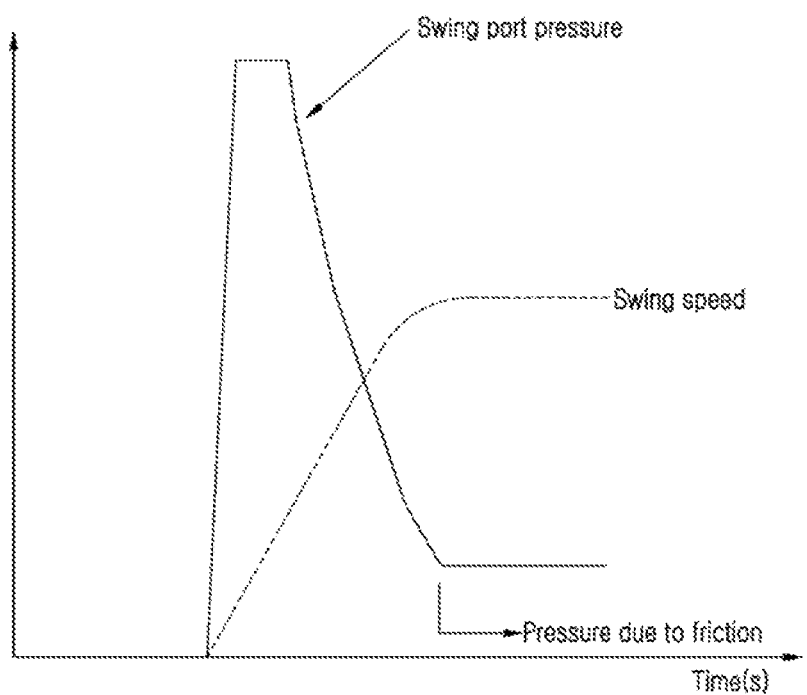

SYSTEM FOR MEASURING FRICTION FORCE OF EXCAVATOR SWING DEVICE FOR SUPPLYING LUBRICATING OIL

BACKGROUND AND SUMMARY

The present invention relates to a system for measuring a swing friction force of excavator swing device and more particularly, an excavator having a swing friction force measurement system of an excavator swing device, which measures a friction force of the swing system based on an operational hydraulic pressure value of a swing motor, and informs the operator of the moment when the friction force measured is above a predetermined value so that the lubricating oil is supplied to make the lubricating condition maintained efficiently.

In the conventional swing system of the hydraulic excavator, the maintenance of lubrication is done by supplying the lubricating oil in a predetermined period of the operation. However, since the operation environment and the work condition are different, it would not be the best way to supply the lubricating oil in every predetermined period of the operation. In other words, as every excavator has the different optimal period to supply the lubricating oil to the swing system, the supply of the lubricating oil at the fixed period may result in supplying the lubricating oil too early or too late.

Accordingly, the present invention has been made to solve the aforementioned problems occurring in the related art, and it is an object of the present invention to provide an excavator having a swing friction force measurement system of the excavator swing device for the supply of lubricating oil, which measures the friction force of the swing device, and informs the operator of the right time to supply the lubricating oil, thus avoiding the unnecessary consumption or late supply of the lubrication oil as well as optimizing the operation of an excavator.

To achieve the above and other objects, in accordance with an embodiment of the present invention, there is provided an excavator comprising; at least one of gyro sensors that detect a slope of the excavator, a swing motor that rotates an upper body of the excavator, a first pressure sensor that detects an operational hydraulic pressure value applied to the swing motor, a swing joystick for driving the swing motor, a second pressure sensor that detects an operational value inputted to the swing joystick, and a controller.

The controller of the excavator receives the information detected by the gyro sensor, the first pressure sensor, and the second pressure sensor, and displays a message to supply the lubricating oil when the operational hydraulic pressure value of the swing motor that is detected by the first pressure sensor is higher than a predetermined value, which is judged under the condition that a maximum value of manipulation is applied to the joystick for more than a minimum measurement time at a swing friction force measurement mode.

According to the embodiment of the present invention having the above-described configuration, the right time of supplying the lubricating oil can be informed to the operator by detecting a swing friction force of an excavator, thus bringing the effect of efficient maintenance of a swing system of the excavator.

BRIEF DESCRIPTION OF THE DRAWINGS

FIG. 1 is a system configuration of an excavator that can detect a swing friction force.

FIG. 2 is an example of the posture of the excavator for detecting the swing friction force.

FIG. 3 is a flow diagram of an algorithm for measuring the swing friction force.

FIG. 4 is a graph showing the relation between an operational pressure and a swing speed of a swing motor.

*EXPLANATION OF REFERENCE NUMERALS FOR MAIN PARTS IN THE DRAWING

10; first pressure sensor
20; second pressure sensor
30; joystick
70; hydraulic pump
80; spool valve
90; swing motor
110; measurement mode button

DETAILED DESCRIPTION

Hereinafter, the present invention will be described in detail with reference to the accompanying drawings.

Although the present invention has been described with reference to the preferred embodiment in the attached figures, it is to be understood that various equivalent modifications and variations of the embodiments can be made by a person having an ordinary skill in the art without departing from the spirit and scope of the present invention as recited in the claims.

Accordingly, the drawings and description are to be regarded as illustrative in nature and not restrictive, and like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

FIG. 1 is the system configuration of the excavator that can detect the swing friction force.

If the operator manipulates a swing joystick (30) to the maximum, the hydraulic energy generated by a hydraulic pump (70) drives a swing motor (90) through a spool valve (80), which thus rotates an upper body of an excavator. FIG. 4 is the graph showing the relation between an operational pressure and a swing speed of the swing motor as the upper body of the excavator is rotated.

Referring to FIG. 4, an operational hydraulic pressure for revolving the upper body is applied to the swing motor (90) by a maximum value as the swing speed begins to increase, and the pressure gradually decreases until the swing speed approaches the maximum value at which only a minimal pressure of the operational hydraulic pressure is applied. The pressure applied at the maximum swing speed is mainly due to a friction force of the swing system including a swing gear.

Accordingly, if the pressure is measured at the maximum swing speed, the increase of the friction force can be found out and used to tell the operator the time to supply the lubricating oil to a swing gear system (60). The excavator according to the present invention is provided with a swing friction force measurement mode for measuring the swing friction force of the upper body of the excavator, and may be provided with a button (110) to start the swing friction force measurement mode.

The excavator according to the present invention comprises at least one of the gyro sensors (100) to detect the slope of the excavator. The gyro sensor detects the rotation inertia and provides an angle rotated per unit time around one axis. The gyro sensor of the present invention detects whether the upper body of the excavator can be rotated at the right position, or the excavator is positioned on the level ground enough to rotate. For example, four gyro sensors are provided in FIG. 1.

The excavator according to the present invention further comprises a swing motor (90) that rotates the upper body of the excavator, a first pressure sensor (10) that detects an operational hydraulic pressure value applied to the swing motor, a swing joystick (30) for driving the swing motor, a second pressure sensor (20) that detects the operational value inputted to the swing joystick (30).

The excavator according to the present invention further comprises a controller (40) which receives an information from the gyro sensor (100), the first pressure sensor (10), and the second pressure sensor (20), and the operational pressure value is detected by the first pressure sensor when the swing joystick is manipulated to the maximum for more than a minimum measurement time under the swing friction force measurement mode. Moreover, a display unit (50) may be connected to the controller (40) so that the information is transmitted to the operator.

As described above, the excavator may further comprise the friction force measurement button (110) to start the swing friction force measurement mode. If the button (110) is pressed, the controller (40) judges whether the excavator is positioned at the level ground based on the slope detected by the gyro sensor (100). If the slope is not appropriate to detect the friction force, the controller (40) provides information with the operator by the display unit (50) that the excavator is not appropriately positioned so that the operator controls the excavator to the level position.

FIG. 2 is the example of the posture of the excavator for detecting the swing friction force. In order to measure consistently the operational pressure applied to the swing motor (90), the upper body of the excavator should maintain a posture having the least inertia moment of rotation in the swing friction measurement mode. Referring to FIG. 2, the upper body of the excavator can determine the posture having the least inertia moment of rotation, which is such that the working device such as boom, arm or bucket is bended to get close to the rotation axis of the upper body of the excavator.

The swing joystick (30) has to be manipulated to a maximum for more than the minimum measurement time under the swing friction force measurement mode so that the swing speed reaches the maximum speed. The minimum measurement time means the predetermined time taken for the swing speed to reach the maximum speed.

FIG. 4 is the graph showing the relation between an operational hydraulic pressure and a swing speed of the swing motor. Referring to FIG. 4, if the upper body of the excavator begins to swing, the swing port pressure as the operational hydraulic pressure applied to the swing motor abruptly increases, reaches at a maximum of the hydraulic pressure in a certain time, and then decreases. The swing speed smoothly increases, reaches the maximum swing speed, and then maintains the maximum speed. At this moment, the operational pressure of the swing motor is the pressure generated by the friction applied to the swing motor, and if the friction pressure is measured to be high, it can be judged that the swing motor is deficient in the lubricating oil.

Accordingly, a minimum measurement time for which the upper body of the excavator maintains the posture having the least inertia moment of rotation and the swing joystick is manipulated to the maximum should be set to be longer than the time taken for the swing motor to reach the maximum speed.

Under the swing friction measurement mode, i) if the joystick is manipulated to the extent less than the maximum, or ii) the joystick is manipulated at the maximum for less than the minimum measurement time, it is difficult to reach the maximum swing speed. Thus, if the upper body of the excavator does not reach the maximum swing speed, it would be difficult to judge whether or not the operational pressure of the swing motor generated by the friction is due to the lack of the lubricating oil.

Therefore, the controller of the excavator according to the present invention may guide the operator so that the joystick is manipulated to the maximum for the more than the minimum measurement time, if the joystick is manipulated to the extent less than the maximum, or the joystick is manipulated at the maximum for less than the minimum measurement time. Such guide can be made by display or sound.

FIG. 3 is the flow diagram of the algorithm for measuring the swing friction force.

The excavator according to the present invention can judge based on the following procedure whether the lubricating oil needs to be supplied when the upper body of the excavator swings. First of all, the position and the posture of the excavator need to be checked so that the swing friction force of the upper body can be measured under the swing friction force measurement mode.

In S10, the slope of the excavator is detected by at least one of the gyro sensors. The controller of the excavator detects based on a slope whether the upper body of the excavator is positioned on the level ground (S20). If the excavator is detected not to be positioned on the level ground, the controller provides information with the operator by the display unit that the excavator is not appropriately positioned (S30).

If the upper body of the excavator is found to be positioned on the level ground in S20, the operator swings the upper body using the swing joystick. At this moment, the operator has to manipulate the swing joystick to the maximum (Full lever) so as to make the swing speed reach the maximum (S50). In the meantime, the second pressure sensor detects the operational value inputted to the swing joystick (S60).

If the joystick is manipulated to the extent less than the maximum of a joystick stroke or an operational manipulation amount, the controller may guide the operator to input the maximum operational value. (S80) However, even if the joystick is manipulated to the maximum, the input may not last for the sufficient time. If the joystick is manipulated at the maximum value for less than the minimum measurement time, S80 may further comprise the function in that the controller guides the operator so that the maximum operational value can be inputted for more than the minimum measurement time.

The minimum measurement time for which the upper body of the excavator maintains the posture having the least inertia moment of rotation and the swing joystick is manipulated to the maximum should be set to be longer than the time taken for the swing motor to reach the maximum speed.

If the joystick is manipulated at the maximum value for more than the minimum measurement time, it proceeds to the step of rotating the upper body of the excavator until the swing motor reaches the maximum swing speed (S70). After the minimum measurement time, the first pressure sensor detects the operational pressure value of the swing motor (S80), and the controller judges whether the operational pressure value is greater than the predetermined value (S100). If the operational pressure value is greater than the predetermined value, the controller provides an information with the operator by the display unit to supply the lubricating oil (S110), thus allowing the efficient management of supplying the lubricating oil.

What is claimed is:

1. An excavator comprising:
   at least one gyro configured to detect a slope of an excavator;
   a swing motor that rotates an upper body of the excavator;
   a first pressure sensor that detects an operational hydraulic pressure value applied to the swing motor;
   a swing joystick for driving the swing motor;
   a second pressure sensor that detects an operational value inputted to the swing joystick; and,
   a controller that receives an information detected by the gyro sensor, the first pressure sensor, and the second pressure sensor, and detects the operational hydraulic pressure value of the swing motor by the first pressure sensor when a maximum manipulation is applied to the joystick for more than a minimum measurement time at a swing measurement mode,
   wherein the minimum measurement time is set to be longer than a time taken for the swing motor to reach a maximum speed when the swing motor swings the upper body of the excavator, for which the upper body of the excavator maintains a posture having a minimum inertia moment of rotation in which a working device of the excavator is disposed proximate a rotation axis of the upper body of the excavator and the swing joystick is manipulated to a maximum extent.

2. The excavator of claim 1, further comprising a display unit that is connected to the controller, wherein the controller provide an information with the operator by the display unit when the excavator is detected not to be positioned at the level ground based on the slope detected by the gyro sensor at a swing friction force measurement mode.

3. The excavator of claim 1 wherein the controller displays a message to supply lubricating oil when the operational hydraulic pressure value of the swing motor that is detected by the first pressure sensor is greater than a predetermined value after the minimum measurement time.

4. A method for managing a swing system of an excavator, comprising:
   detecting a slope of the excavator by at least one gyro sensor;
   detecting an operational value inputted to a swing joystick by a second pressure sensor;
   rotating an upper body of the excavator until a swing motor reaches a maximum swing speed if the joystick is manipulated at a maximum value for more than a minimum measurement time;
   detecting an operational hydraulic pressure value of the swing motor by the first pressure sensor after the minimum measurement time; and
   providing via the controller information to an operator by a display unit to supply a lubricating oil if the operational hydraulic pressure value detected is greater than a predetermined value.

5. The method of claim 4, wherein the minimum measurement time for which the upper body of the excavator maintains a posture having a minimum inertia moment of rotation in which a working device of the excavator is disposed proximate a rotation axis of the upper body of the excavator, and the swing joystick is manipulated to the maximum value, is set to be longer than a time taken for the swing motor to reach the maximum swing speed when the swing motor swings the upper body of the excavator.

6. The method of claim 4, wherein, based on the slope detected by the gyro sensor, the controller detects whether the excavator is positioned on a level ground, and provides the information with the operator by the display unit if the excavator is detected not to be positioned on the level ground.

* * * * *